US011620005B2

(12) United States Patent
Lai et al.

(10) Patent No.: US 11,620,005 B2
(45) Date of Patent: Apr. 4, 2023

(54) STYLUS PEN

(71) Applicant: ASUSTEK COMPUTER INC., Taipei (TW)

(72) Inventors: Chin Chung Lai, Taipei (TW); Yung-Hsiang Chen, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 17/586,084

(22) Filed: Jan. 27, 2022

(65) Prior Publication Data

US 2022/0283651 A1 Sep. 8, 2022

(30) Foreign Application Priority Data

Mar. 2, 2021 (CN) .......................... 202120453490.6

(51) Int. Cl.
*G06F 3/0354* (2013.01)
*H01R 13/22* (2006.01)
*H01R 13/187* (2006.01)
*H02J 7/00* (2006.01)

(52) U.S. Cl.
CPC ....... *G06F 3/03545* (2013.01); *H01R 13/187* (2013.01); *H01R 13/22* (2013.01); *H02J 7/0042* (2013.01)

(58) Field of Classification Search
CPC ... G06F 3/03545; H02J 7/0042; H02J 7/0044; H02J 7/0045; H01R 13/187; H01R 13/22
See application file for complete search history.

(56) References Cited

U.S. PATENT DOCUMENTS

| 2016/0291706 | A1* | 10/2016 | Trutna | G06F 3/03545 |
| 2019/0278389 | A1* | 9/2019 | Yang | G06F 3/0383 |
| 2020/0033964 | A1* | 1/2020 | Aoki | G06F 3/0383 |
| 2020/0065536 | A1* | 2/2020 | Utykanski | H02J 7/0047 |

FOREIGN PATENT DOCUMENTS

| CN | 208459978 U | 2/2019 | |
| CN | 110471542 A | 11/2019 | |
| EP | 3531253 A1 * | 8/2019 | ........... G06F 1/1635 |
| TW | M429898 U | 5/2012 | |

* cited by examiner

*Primary Examiner* — Temesghen Ghebretinsae
*Assistant Examiner* — Ivelisse Martinez Quiles
(74) *Attorney, Agent, or Firm* — Muncy, Geissler, Olds & Lowe, P.C.

(57) ABSTRACT

A stylus pen for use with a charging base is provided. The stylus pen includes a pen body, a pen tip, a battery, a first receiving end conductive structure, and a second receiving end conductive structure. The pen body includes an opening to connect to the charging base. The pen tip is connected to the pen body. The battery is disposed in the pen body. The first receiving end conductive structure and the second receiving end conductive structure are disposed in the opening, and are respectively electrically connected to the battery.

6 Claims, 9 Drawing Sheets

STYLUS PEN

CROSS-REFERENCE TO RELATED APPLICATION

This application claims the priority benefit of China application serial No. 202120453490.6, filed on Mar. 2, 2021. The entirety of the above-mentioned patent application is hereby incorporated by reference herein and made a part of the specification.

BACKGROUND OF THE INVENTION

Field of the Invention

The disclosure relates to a stylus pen, and in particular, to a stylus pen chargeable through a charging base.

Description of the Related Art

A stylus pen (or a stylus) is a pen-shaped input device, and is used for inputting instructions to electronic devices with touch screens such as notebook computers, tablet computers, and smart phones. A conventional stylus pen is only fixed outside a casing of the electronic device or inserted into the casing of the electronic device, cannot be easily accessed and charged, and is easy to be lost.

BRIEF SUMMARY OF THE INVENTION

The disclosure provides a stylus pen for use with a charging base. The stylus pen includes a pen body, a pen tip, a battery, a first receiving end conductive structure, and a second receiving end conductive structure. The pen body includes an opening to connect to the charging base. The pen tip is connected to the pen body. The battery is disposed in the pen body. The first receiving end conductive structure is disposed in the opening. The second receiving end conductive structure is disposed in the opening. The first receiving end conductive structure and the second receiving end conductive structure are respectively electrically connected to the battery.

The stylus pen of the disclosure allows a user to choose to insert the stylus pen upright into a charging base for charging, or insert the stylus pen into the charging base for charging through the opening of the pen body of the stylus pen, so as to match different use states. In this way, in addition to being convenient for the user to access, the stylus pen is chargeable at the same time, so as to meet different uses' requirements.

DETAILED DESCRIPTION OF THE EMBODIMENTS

More detailed descriptions of specific embodiments of the disclosure are provided below with reference to the schematic diagrams. The advantages and features of the disclosure are described more clearly according to the following description and claims. It should be noted that all of the accompanying drawings use very simplified forms and imprecise proportions, which are only used for assisting in conveniently and clearly explaining the objective of the embodiments of the disclosure.

Figure 1:
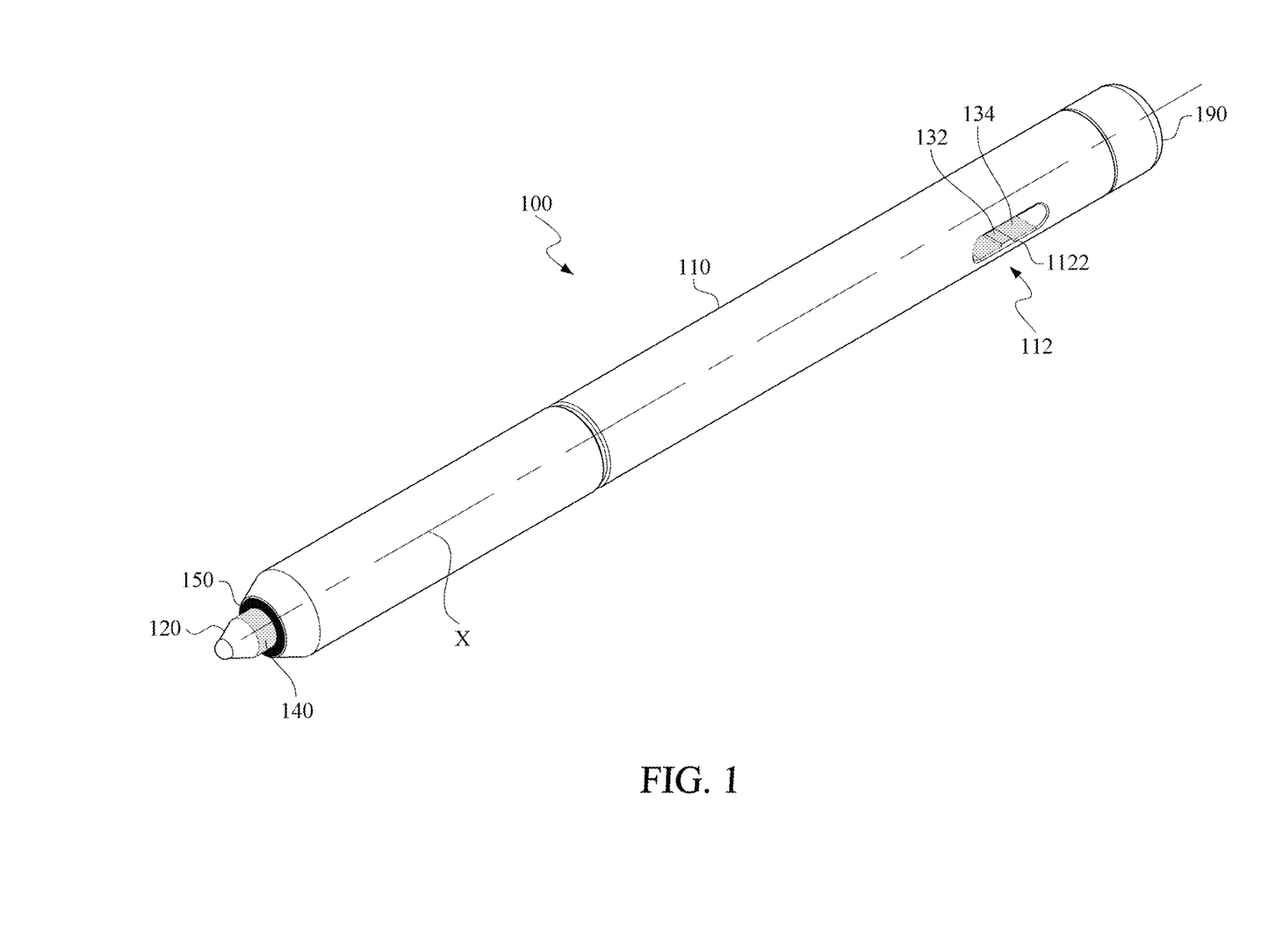
FIG. 1 is a schematic three-dimensional diagram of an embodiment of a stylus pen according to the disclosure.

FIG. 1 is a schematic three-dimensional diagram of an embodiment of a stylus pen according to the disclosure. A stylus pen 100 is used with a charging base. The charging base is installed on an electronic device, in an embodiment, the electronic device is a laptop computer, a tablet computer, or a desktop computer.

As shown in FIG. 1, the stylus pen 100 includes a pen body 110, a pen tip 120, a first receiving end conductive structure 132, and a second receiving end conductive structure 134. The pen tip 120 is connected to the pen body 110. A battery (not shown) is disposed in the pen body 110 to store electrical energy.

The pen body 110 includes an opening 112 to connect to the charging base. The opening 112 runs through the pen body 110, and is perpendicular to an axial direction X of the pen body 110. The first receiving end conductive structure 132 and the second receiving end conductive structure 134 are further disposed in the opening 112, and are respectively electrically connected to the battery as a charging position of the stylus pen 100.

The first receiving end conductive structure 132 and the second receiving end conductive structure 134 are separated from each other. In an embodiment, the first receiving end conductive structure 132 is used as a negative electrode when the stylus pen 100 is charged, and the second receiving end conductive structure 134 is used as a positive electrode when the stylus pen 100 is charged. However, the disclosure is not limited thereto.

In other embodiments, the first receiving end conductive structure 132 is used as a positive electrode when the stylus pen 100 is charged, and the second receiving end conductive structure 134 is used as a negative electrode when the stylus pen 100 is charged. The structure of a charging base used with the stylus pen 100 is described in the subsequent paragraphs corresponding to FIG. 3.

In an embodiment, the opening 112 further includes a protrusion 1122 therein. The first receiving end conductive structure 132 is located on an upper surface of the protrusion 1122, and the second receiving end conductive structure 134 is located on both sides of the protrusion 1122. The first receiving end conductive structure 132 and the second receiving end conductive structure 134 abut against different conductive structures on the charging base to obtain power supply.

In an embodiment, as shown in the figure, the stylus pen 100 further includes a third receiving end conductive structure 140 and a fourth receiving end conductive structure 150. The third receiving end conductive structure 140 is disposed at the pen tip 120, and is electrically connected to the battery. In an embodiment, the third receiving end conductive structure 140 is a conductive ring, and is peripherally disposed around the pen tip 120.

The fourth receiving end conductive structure 150 is disposed at an end of the pen body 110 close to the pen tip 120, and is electrically connected to the battery. The third receiving end conductive structure 140 and the fourth receiving end conductive structure 150 are separated from each other, and therefore, are electrically isolated from each other. The third receiving end conductive structure 140 is used as a negative electrode when the stylus pen 100 is charged, and the fourth receiving end conductive structure 150 is used as a positive electrode when the stylus pen 100 is charged.

Figure 2:
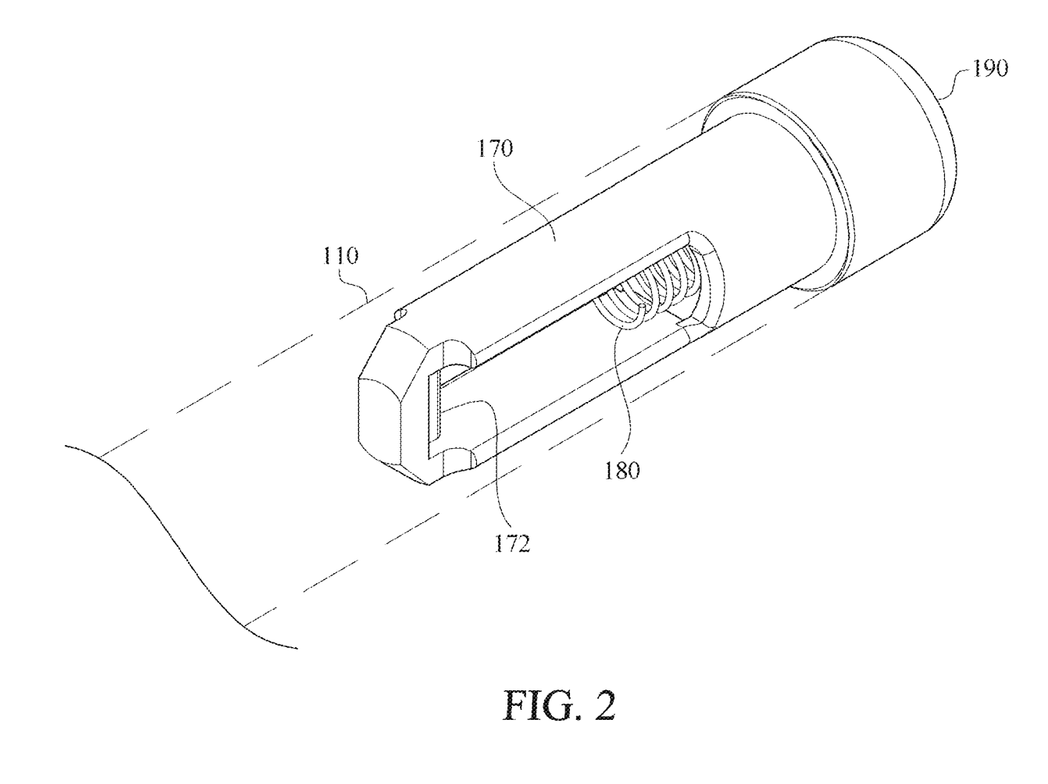
FIG. 2 is a schematic perspective diagram of an embodiment of a periphery of an opening of a pen body of a stylus pen according to the disclosure.

Refer to FIG. 2. FIG. 2 is a schematic perspective diagram of an embodiment of a periphery of the opening 112 of the pen body 110 of the stylus pen 100 according to the disclosure. As shown in the figure, the stylus pen 100 includes a fastener 170, a spring 180, and a pen cover 190.

The fastener 170 is disposed in the pen body 110 and includes a buckle portion 172 extending to a side of the opening 112, to buckle with the charging base. The pen cover 190 is located at an end of the pen body 110 away from the pen tip 120, and is connected to the fastener 170. The fastener 170 is linked to the pen cover 190. The spring 180 is disposed in the pen body 110, and an end of the spring 180 abuts against the pen cover 190. The structure of the charging base used with the stylus pen 100 is described in the subsequent paragraphs corresponding to FIG. 3.

When a user inserts the opening 112 of the pen body 110 into the charging base, the force of the spring 180 drives the buckle portion 172 of the fastener 170 to buckle with the charging base, so that the stylus pen 100 is fixed to the charging base. If the user needs to remove the stylus pen 100, the user simply presses the pen cover 190 to release the fastener 170. For details of this operation, refer to FIG. 5A to FIG. 5D of the disclosure.

Figure 3:
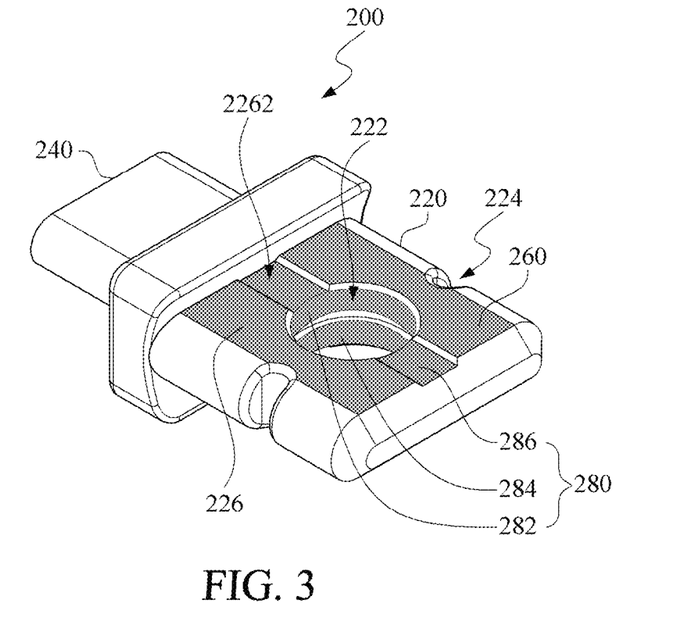
FIG. 3 is a schematic three-dimensional diagram of an embodiment of a charging base used with the stylus pen shown in FIG. 1.

FIG. 3 is a schematic three-dimensional diagram of an embodiment of a charging base used with the stylus pen shown in FIG. 1. As shown in the figure, a charging base 200 includes a base 220, a port 240, a first charging end conductive structure 260, and a second charging end conductive structure 280.

The base 220 includes a through hole 222, to accommodate the pen tip 120 of the stylus pen 100. Two opposite sides of the base 220 respectively include a clamping groove 224 to match the fastener 170 of the stylus pen 100 (refer to FIG. 2 of the disclosure).

The port 240 is disposed on a side of the base 220, and is installed on an electronic device to obtain power supply. In an embodiment, the port 240 is a universal serial bus (USB) port or another port that obtains power supply. A USB Type-C port is used as an example in the figure.

The first charging end conductive structure 260 is formed on an upper surface 226 of the base 220. The second charging end conductive structure 280 is formed in the through hole 222.

The second charging end conductive structure 280 includes an extension portion 286 extending from the through hole 222 to the upper surface 226 of the base 220. In an embodiment, the upper surface 226 of the base 220 further includes a first groove 2262. The first charging end conductive structure 260 is located on both sides of an opening of the first groove 2262, and the extension portion 286 is located on a bottom surface of the first groove 2262.

In an embodiment, the conductive structure of the charging base 200 is configured in a horizontally symmetrical manner in cooperation with the use of the USB Type-C port, which is convenient for the user to use.

The stylus pen 100 and the charging base 200 provided by the disclosure allow the user to choose different use modes according to the needs of the user. The use modes are described below.

Figure 4A:
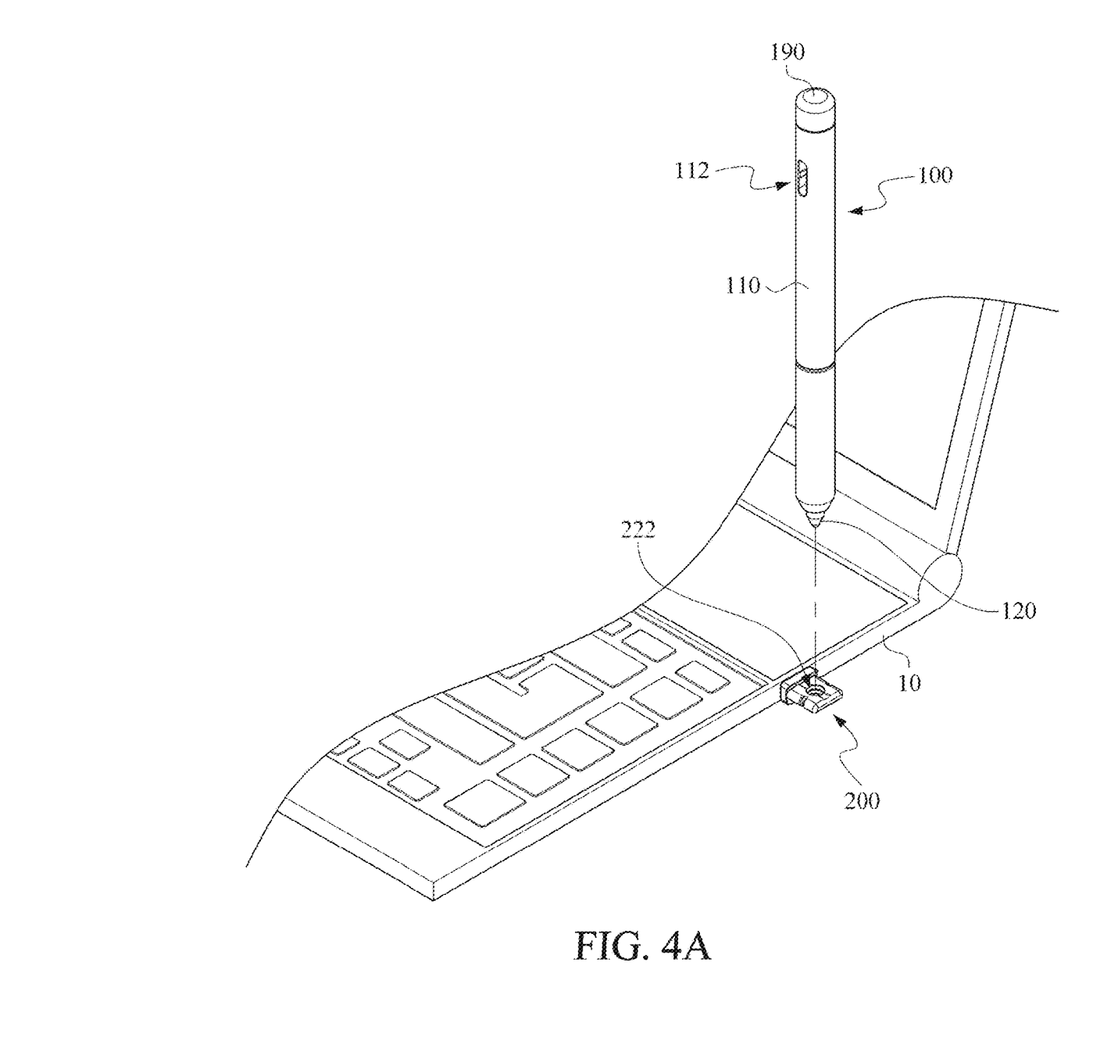
FIG. 4A and FIG. 4B show a first mode of using a stylus pen with a charging base according to the disclosure.
Figure 4B:
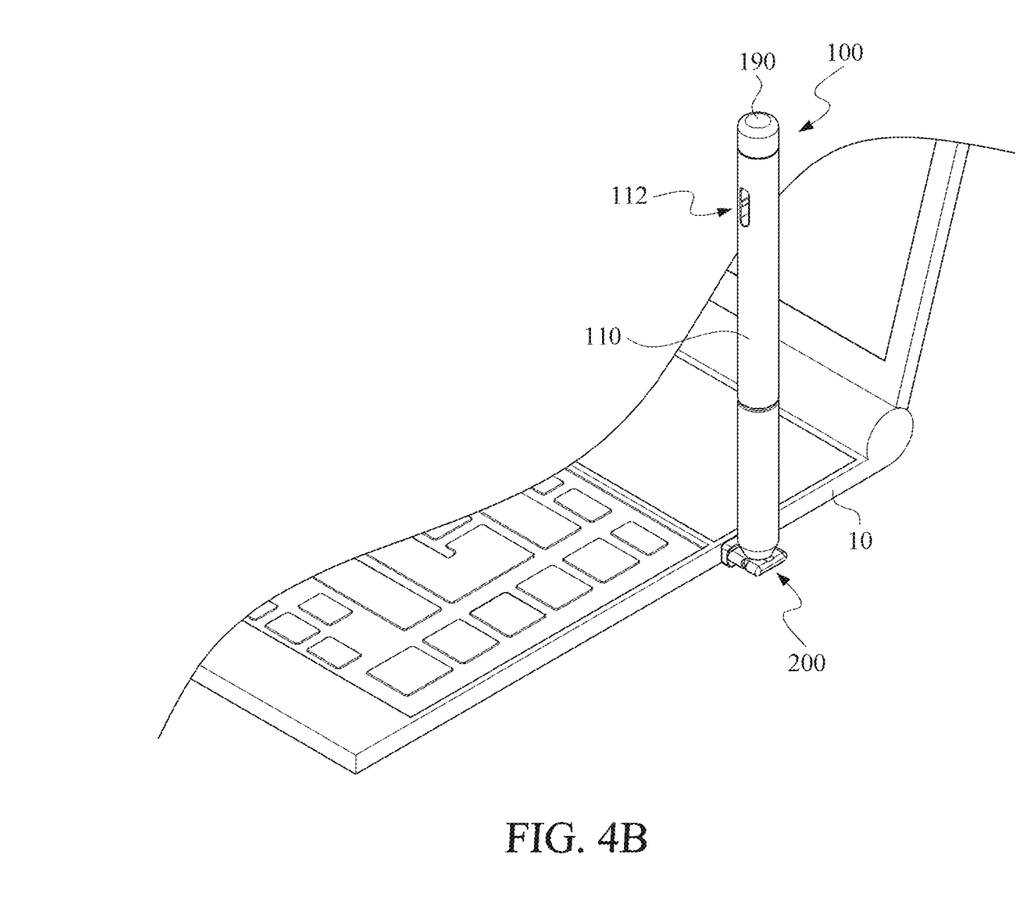
Figure 5A:
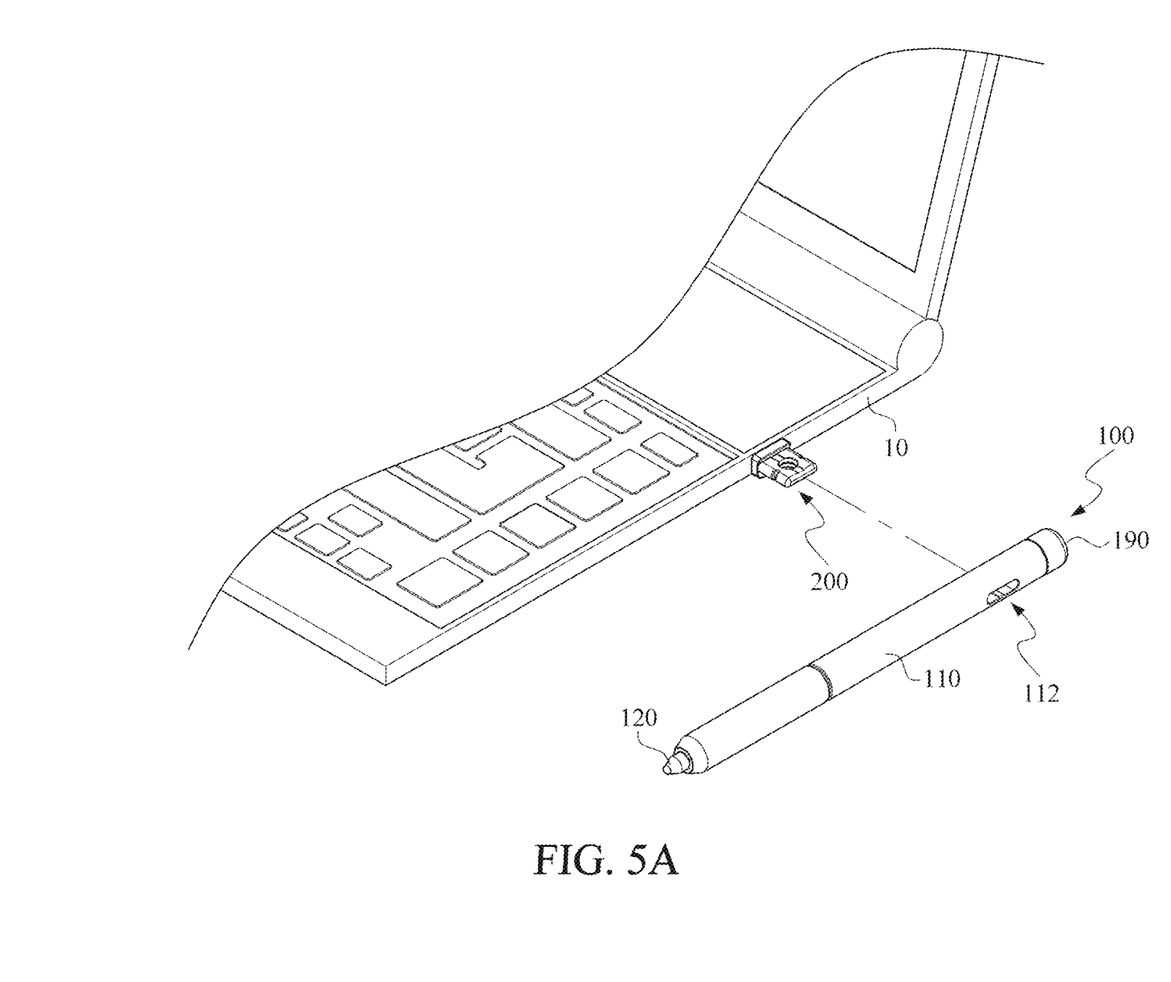
FIG. 5A to FIG. 5D show a second mode of using a stylus pen with a charging base according to the disclosure.
Figure 5B:
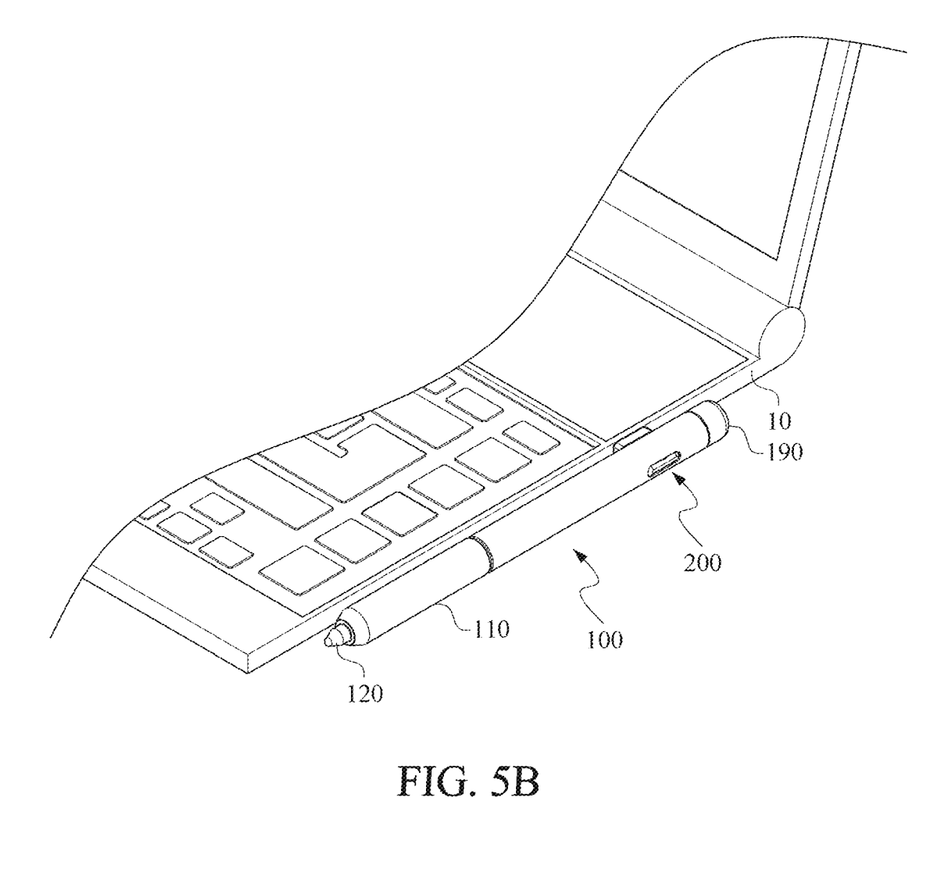
Figure 5C:
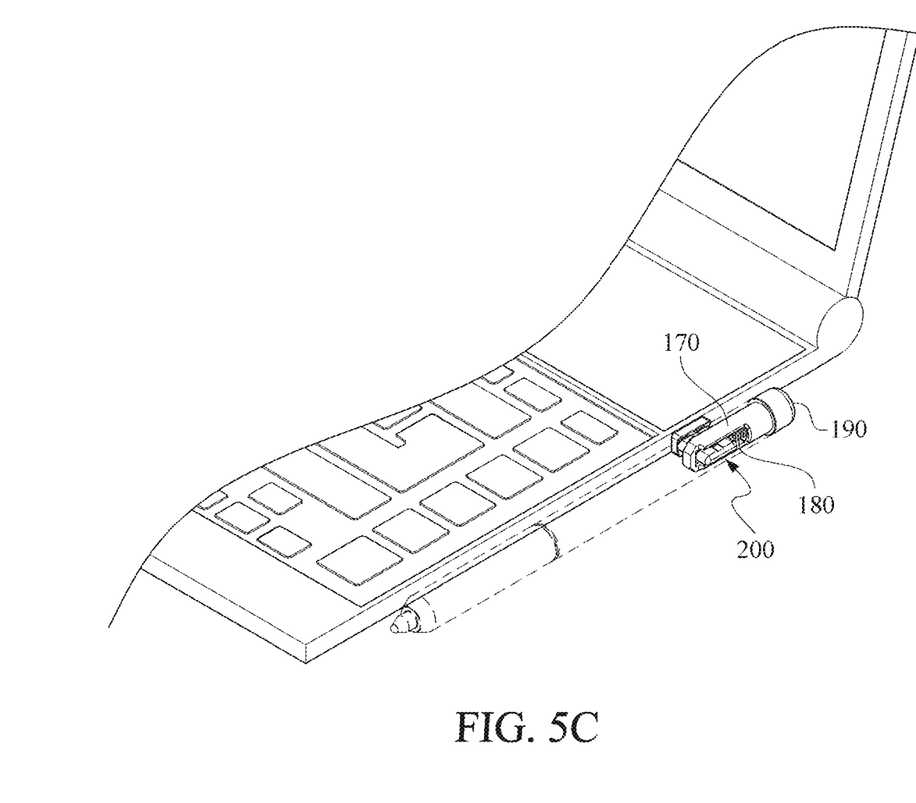
Figure 5D:
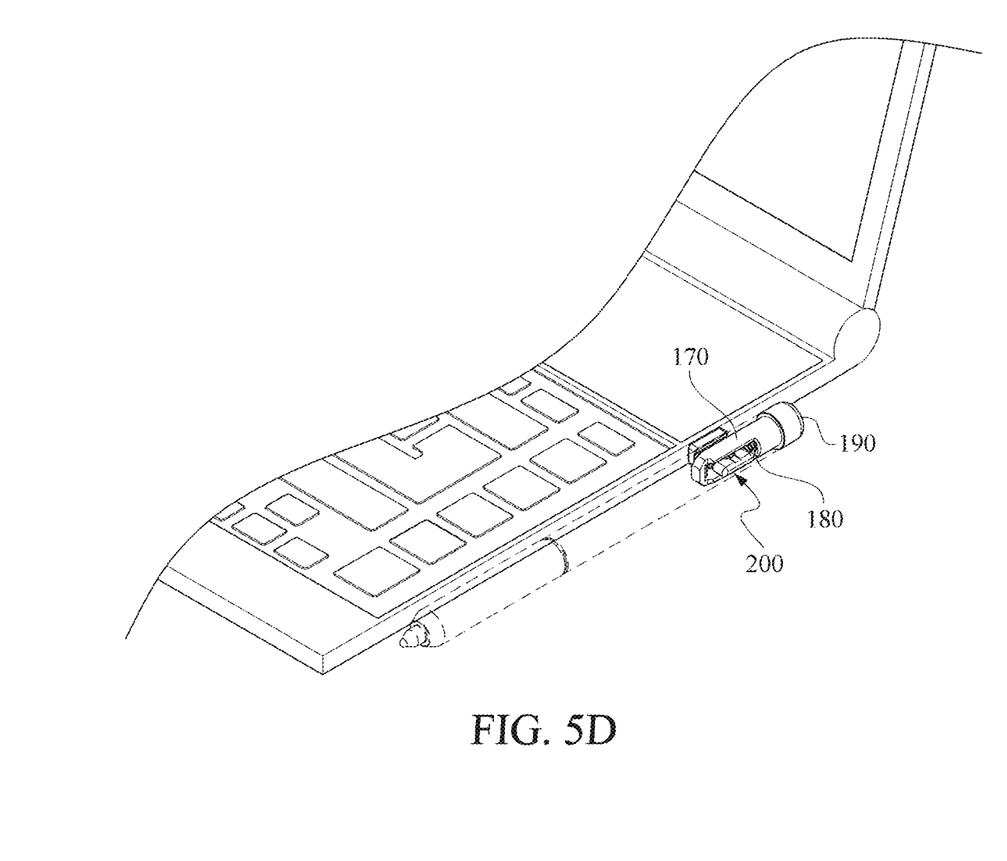

FIG. 4A and FIG. 4B show a first mode of using the stylus pen 100 with the charging base 200 according to the disclosure. FIG. 5A to FIG. 5D show a second mode of using the stylus pen 100 with the charging base 200 according to the disclosure.

Referring to FIG. 4A and FIG. 4B, the first mode of using the stylus pen 100 with the charging base 200 according to the disclosure is to insert the stylus pen 100 upright into the through hole 222 of the charging base 200. This use mode is convenient for the user to access the stylus pen 100 at any time, and allows the user to charge the stylus pen 100 in real time in a process of using the stylus pen 100, so that the stylus pen 100 is kept in a charged state.

Referring to FIG. 1 and FIG. 3 together, when the stylus pen 100 is inserted into the through hole 222 of the charging base 200, the third receiving end conductive structure 140 at the pen tip 120 comes into contact with charging end conductive rings (an upper conductive ring 282 and a lower conductive ring 284 as shown in FIG. 3) in the through hole 222, and the fourth receiving end conductive structure 150 located at an end of the pen body 110 comes into contact with the first charging end conductive structure 260. In this way, the charging base 200 charges the stylus pen 100.

Besides, in an embodiment, the base 220 of the charging base 200 includes a built-in magnet. When the stylus pen 100 is inserted upright into the through hole 222 of the charging base 200, the magnetic attraction generated by the base 220 helps to fix the stylus pen 100 and keep the stylus pen 100 in an upright state, which facilitates charging.

Referring to FIG. 5A to FIG. 5D, the second mode of using the stylus pen 100 with the charging base 200 according to the disclosure is to insert the opening 112 at the pen body 110 of the stylus pen 100 into the charging base 200 in a horizontal direction, so that the stylus pen 100 is fixed to the side of an electronic device 10 for portable use.

Referring to FIG. 1 to FIG. 3 together, when the opening 112 of the pen body 110 of the stylus pen 100 is inserted into the charging base 200, the first receiving end conductive structure 132 in the opening 112 comes into contact with the extension portion 286 of the second charging end conductive structure 280 of the base 220 of the charging base 200, and the second receiving end conductive structure 134 in the opening 112 comes into contact with the first charging end conductive structure 260. In this way, the charging base 200 charges the stylus pen 100.

When the stylus pen 100 needs to be removed, the user presses the pen cover 190 to drive the fastener 170, so that the buckle portion 172 of the fastener 170 is separated from the clamping groove 224 on the base 220. In this way, the stylus pen 100 is removed from the charging base 200.

According to the above, the stylus pen of the disclosure allows a user to choose to insert the stylus pen upright into the charging base for charging, or insert the stylus pen into the charging base for charging through the opening of the pen body of the stylus pen, so as to match different use states. In an embodiment, the user adopts the upright insertion use mode in a process of continuously using the stylus pen, and adopts the horizontal insertion use mode through the opening of the pen body when the user needs to move the electronic device. In this way, in addition to being convenient for the user to access, the stylus pen is chargeable at the same time, so as to meet different uses' requirements.

The disclosure is disclosed above with the embodiments but is not limited thereto. A person skilled in the art may make some modifications and embellishments without departing from the spirit and scope of the disclosure. Therefore, the protection scope of the disclosure should be defined by the claims.

What is claimed is:

1. A stylus pen, for applying to an electronic device with a charging base, comprising:
    a pen body, comprising an opening to connect to the charging base;
    a pen tip, connected to the pen body;
    a battery, disposed in the pen body;
    a first receiving end conductive structure, disposed in the opening; and
    a second receiving end conductive structure, disposed in the opening,
    wherein the first receiving end conductive structure and the second receiving end conductive structure are respectively electrically connected to the battery,
    wherein the opening further comprises a protrusion therein, and the first receiving end conductive structure is located on an upper surface of the protrusion, and
    wherein the second receiving end conductive structure is located on both sides of the protrusion.

2. The stylus pen according to claim 1, further comprising:
    a third receiving end conductive structure, disposed in the pen tip and electrically connected to the battery; and
    a fourth receiving end conductive structure, disposed at an end of the pen body close to the pen tip and electrically connected to the battery.

3. The stylus pen according to claim 2, wherein the third receiving end conductive structure is a conductive ring.

4. The stylus pen according to claim 1, wherein the opening runs through the pen body, and is perpendicular to an axial direction of the pen body.

5. The stylus pen according to claim 1, further comprising a fastener and a pen cover, wherein the fastener is located on a side of the opening, the pen cover is located at an end of the pen body away from the pen tip, and the fastener is linked to the pen cover.

6. The stylus pen according to claim 5, further comprising a spring disposed in the pen body, and an end of the spring abuts against the pen cover.

* * * * *